(12) United States Patent
Roe et al.

(10) Patent No.: US 6,471,834 B2
(45) Date of Patent: Oct. 29, 2002

(54) PHOTO-ASSISTED ELECTROLYSIS APPARATUS

(76) Inventors: A. Nicholas Roe, 16014 Craighurst Dr., Houston, TX (US) 77059; Arthur N. Roe, 16014 Craighurst Dr., Houston, TX (US) 77059

(*) Notice: Subject to any disclaimer, the term of this patent is extended or adjusted under 35 U.S.C. 154(b) by 0 days.

(21) Appl. No.: 09/773,306

(22) Filed: Jan. 31, 2001

(65) Prior Publication Data

US 2002/0060161 A1 May 23, 2002

Related U.S. Application Data

(60) Provisional application No. 60/179,241, filed on Jan. 31, 2000.

(51) Int. Cl.$^7$ .............................. C25B 9/00; C25B 11/00
(52) U.S. Cl. .................................. 204/242; 204/290.01
(58) Field of Search ............................. 204/242, 290.01

(56) References Cited

U.S. PATENT DOCUMENTS

| | | | |
|---|---|---|---|
| 4,171,993 A | 10/1979 | Albertson | |
| 4,211,620 A | 7/1980 | Fowler | |
| 4,305,794 A | 12/1981 | Davidson et al. | |
| 4,437,954 A | 3/1984 | Sammells et al. | |
| 4,466,869 A | * 8/1984 | Ayers | 205/340 |
| 4,501,804 A | * 2/1985 | Bockris et al. | 204/242 X |
| 4,957,610 A | 9/1990 | Hawkins | |
| 5,022,970 A | 6/1991 | Cook et al. | |
| 5,723,029 A | 3/1998 | Shimoyama | |

FOREIGN PATENT DOCUMENTS

| | | |
|---|---|---|
| JP | 51-45993 | 4/1976 |
| JP | 51-83092 | 7/1976 |
| JP | 83-750704/35 | 7/1983 |
| JP | 83-750804/35 | 7/1983 |
| WO | WO 80/00353 | 3/1980 |

* cited by examiner

*Primary Examiner*—Donald R. Valentine
(74) *Attorney, Agent, or Firm*—Fellers, Snider, Blankenship, Bailey & Tippens, P.C.

(57) ABSTRACT

An apparatus and method for performing electrolysis on materials such as water, thereby electrically separating the electrolyte into its elemental components. More specifically, according to a preferred aspect of the instant invention, there is provided an apparatus for splitting water into hydrogen and oxygen that uses a specially prepared cathode in conjunction with incident light energy to increase the efficiency of that process. A preferred embodiment of this apparatus uses the photo collector/cathode which comprises a thin layer of metal, preferably nickel, deposited by electroplating or a similar technique onto a conductive surface (e.g., a sheet of copper metal). During the electrolysis process, the cathode is irradiated with light, thereby reducing the amount of electrical energy necessary to separate a given quantity of electrolytic material.

16 Claims, 4 Drawing Sheets

PHOTO-ASSISTED ELECTROLYSIS APPARATUS

This application claims the benefit of Ser. No. 60/179,241, filed Jan. 31, 2000.

TECHNICAL FIELD

The present invention relates generally to the field of electrolysis and, more particularly, to the separation of water into its elemental components via electrical current.

BACKGROUND

Our world has been running on fossil fuels (coal and petroleum) for over two hundred years, and is fast using these fuels up. Since it takes millions of years for these fuels to form, the need for an alternate source of energy is growing more and more urgent. The burning of fossil fuels has also been a major contributor to pollution and a possible cause of global warming.

Wind, water, geothermal and tidal energy sources have all been developed but they are limited to specific places. Fission has been developed as well, but has met sturdy resistance from environmental action groups. Fusion energy has yet to live up to its promise. Solar energy via photovoltaic cells has also been developed but these use less than 15% of the available energy and are not yet cost efficient.

Fuel cells, which produce energy by recombining oxygen and hydrogen to generate electricity, have reached 70 to 80 percent efficiency and, since they produce only water, are non-polluting and do not contribute to the greenhouse effect. Until now, the main source of hydrogen for such systems has been through the electrolysis of water. Because energy is required for the electrolysis process, and because in any system some energy is lost to entropy, this process has been inefficient. Many elaborate methods have been designed to reduce the amount of energy needed to split water. Because these either have not worked, or have been very expensive or inefficient processes, it has not been practical to scale up any of these methods for commercial use.

It has been known for over 100 years that hydrogen and oxygen gas may be generated by the electrolysis of water. Electrolysis utilizes electrical power to create a current between an anode and cathode, thereby breaking water into its constituent components, hydrogen and oxygen. Of course, this process has the potential to be particularly important in view of the concern associated with access to hydrocarbons in politically unstable countries. As is well known to those skilled in the art, hydrogen is a clean, plentiful and readily usable fuel. Needless to say, an efficient and economical method of producing hydrogen from readily available materials such as water could have significant value, especially in countries that have few hydrocarbon deposits. Consequently, there is a growing interest in developing new techniques for the efficient production of molecular hydrogen.

In order to reduce the amount of electrical energy necessary to sunder the hydrogen-oxygen bond in water, solar energy is being explored as an energy source. One approach which has been actively explored involves chemical processes which resemble photosynthesis in order to convert water and air into combustible hydrocarbons. Another approach, which is the approach taken by the instant invention, is to accomplish production of hydrogen gas by using sunlight to effect electrolysis of water. Generally, the emphasis with electrolysis has been to use some type of exotic solid state photoelectric cell to generate current and release hydrogen and oxygen. To date, the solid state photoelectric approaches have not proven economically successful.

In 1905, Albert Einstein explained the photoelectric effect using the quantum hypothesis. The photoelectric effect involves the ejection of electrons from a metal surface by light in a vacuum tube. Einstein developed the equation for the energy of these electrons in 1906. The equation is:

$$E = h\upsilon - W$$

This equation means that the energy (E) of the electrons is equal to Plank's constant (h), multiplied by the frequency of the light ($\upsilon$), minus the work function (W) of the metal.

For the energy of the electrons to equal that needed for the electrolysis of water, the frequency of light must be in the range of high frequency ultraviolet. Thus, solar energy has heretofore had only limited use in producing hydrogen.

Thus, there exists a need for a method and apparatus that provides efficient electrolysis of water into its constituent elements. Accordingly, it should now be recognized, as was recognized by the present inventors, that there exists, and has existed for some time, a very real need for an invention that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

This instant invention provides an efficient method of performing electrolysis on water, thereby separating it into its elemental components. More specifically, according to a preferred aspect of the instant invention, there is provided an apparatus and method for splitting water into hydrogen and oxygen. The inventive apparatus and method employ a specially prepared cathode in conjunction with incident light energy to increase the efficiency of that process.

According to a first preferred embodiment, there is provided an electrolysis apparatus wherein the cathode serves both as a photon collector and as an electrode for electrolysis. Of particular importance for purposes of the instant invention is the fact that the photon collector/cathode consists of a thin layer of metal, preferably nickel, deposited by electroplating or some similar technique (e.g., vapor deposition) onto a conductive surface (e.g., a sheet of copper metal). The electroplating produces a "blacked" (i.e., black or nearly black or otherwise darkened) surface which appears to be a microcrystalline deposit of metal. This metal "black" serves both to collect and absorb the light and simultaneously acts as a cathodic surface for the electrolysis of water. The material and structure (i.e., the way that the surface metal is deposited) affect the efficiency of the photo-assisted electrolysis and operate to capture energy over a much larger portion of the solar spectrum.

In operation, the anode and specially prepared cathode are preferably immersed in a solution comprising an electrolyte along with the material (e.g., water, acetic acid, or other organic or inorganic compound) that is to be electrolyzed. An electrical potential is then created between the anode and the specially prepared cathode, and the cathode is irradiated with light. Light incident upon the cathode contributes additional energy to the electrolysis process, thereby reducing the amount of electricity necessary to separate a given quantity of water molecules. Of course, in the preferred embodiment, the incident light will be solar light, although many other light sources might be used. However, solar light sources have the advantage of providing photons to the reaction at no "cost", in contrast to artificial light sources which must be supplied with power, thereby reducing the overall efficiency of the process.

Although light has previously been used to assist in the electrolysis process, such prior usage has occurred within much more complex systems of semiconductors and/or metal ions complexed in organic compounds. Thus, the principle advantage of the instant apparatus and method is that the inventive system operates simply and efficiently to reduce the electrical energy required for electrolysis.

Since much less energy is needed to produce hydrogen using the inventive system, fuels cells can now be run on hydrogen gas ($H_2$) that is produced much efficiently and cost effectively, thus providing commercial viability. In addition, the inventive method of producing hydrogen gas does not threaten the environment as do fossil and nuclear energy sources.

The inventive system can be employed at any level or scale, from individual cell phones to power plants. Because the process uses inexpensive, readily available materials, it could be used in third world countries, as well as in the earth's most technologically advanced countries. Furthermore, because energy and water are the only products of this process, the problem of pollution has been eliminated.

In addition to hydrogen production, the inventive apparatus and method can also be used in other electrochemical processes. For example, certain organic acids have been shown to decarbonylate and break down under certain electrolysis conditions to methane, ethane and carbon dioxide. This invention can be used to remove or reduce such acids in waste streams through solar assisted electrolysis. A number of similar electrochemical reactions where this invention could be used are known in both organic and inorganic chemistry.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION OF THE PREFERRED EMBODIMENTS

It should be noted at the outset, that within certain broad, general guidelines, the specific details of the geometry and construction of the inventive photo-assisted electrolysis cell are not critical. Indeed, it is well within the ability of one of ordinary skill in the art to construct many different variations of the preferred embodiments given herein. For example, modifications may be made to enhance separation and collection of hydrogen gas and oxygen gas, reduce overvoltage requirements, enhance light collection capabilities, change the ionic composition of the electrolytic solution, etc., without altering the fundamental nature of the invention.

Figure 1:
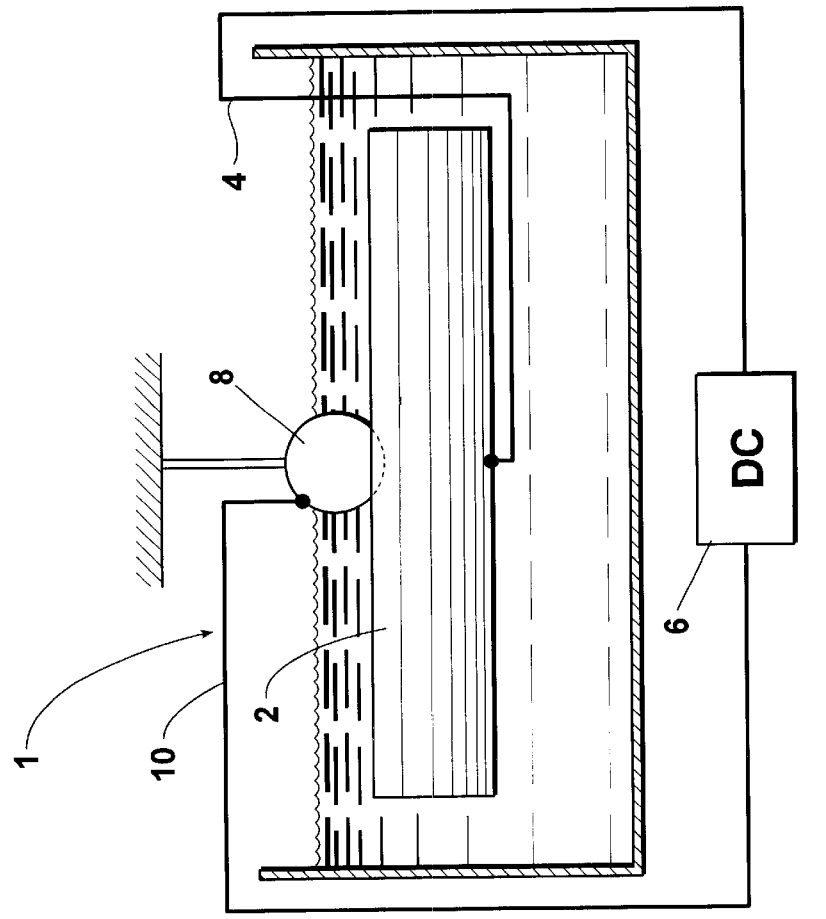
FIG. 1 illustrates an end-view of a preferred electroplating apparatus.
Figure 2:
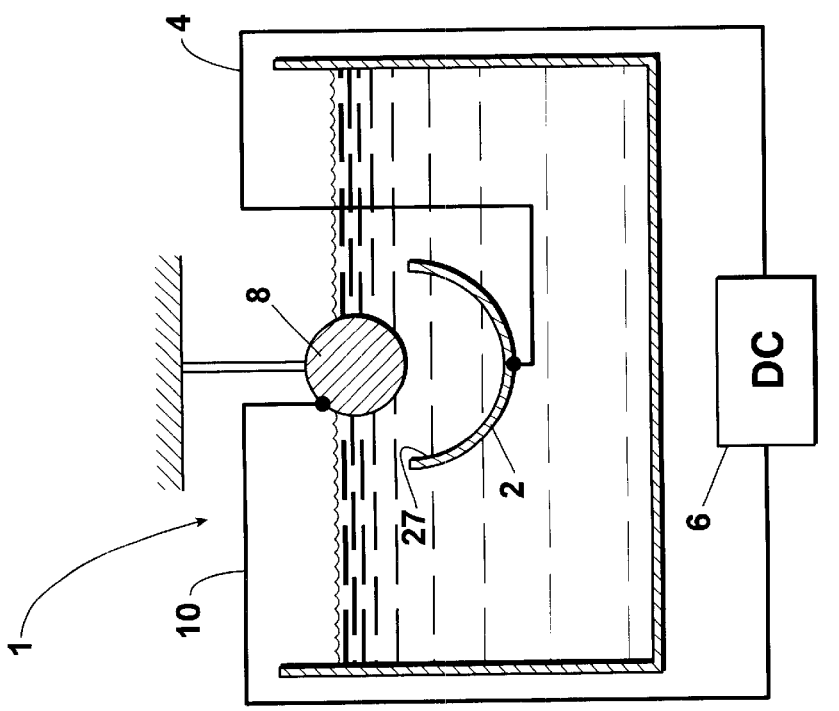
FIG. 2 illustrates a side-view of a the electroplating apparatus of FIG. 1.

An example of an electroplating bath 1 of a type preferred for use in the present invention is depicted in FIGS. 1 and 2. In the electroplating apparatus 1, 2 is a cathode which is being blacked for use in the inventive electrolysis processes. In this example, the base component of cathode 2 is preferably a half cylinder of conductive metal (e.g., copper metal foil) 2 soldered to a wire 4 connecting it to the DC power supply 6. Element 8 is the electroplating anode (in this particular example a nickel coin, i.e., a disk of nickel-containing metal). Anode 8 is preferably moved back and forth over the inner surface of the cathode to deliver a roughly equivalent (i.e., even) layer of the electroplating metal to all parts of the inner surface of the cathode. Container 1 is an electroplating bath containing a solution of a salt of the metal to be deposited on the surface of the cathode. In this example, the salt would preferably be $NiSO_4$.

In this embodiment of the inventive system, cathode 2 is preferably a flexible sheet of metal (e.g., thin, copper metal) formed into a half cylinder. The radius of this partial cylinder is not critical within broad practical limits. The half cylinder 2 is preferably attached to an insulated, conductive wire 4 by, for example, soldering, and then cleaned to remove surface contamination. The half cylinder 2 is then preferably placed in electroplating bath 1 (e.g., a solution of nickel (II) sulfate dissolved in water) and connected to electrical power source 6 so that it operates as the cathode in the electroplating system 1. Anode 8 is also connected to power source 6, by means of insulated wire 10, to begin electro-deposition of a layer of conductive metal (e.g., nickel) onto the concave inside surface 27 of the half cylinder 2.

As will be understood by those skilled in the art, other physical and chemical approaches to depositing the active surface on cathode 2 are certainly possible and have been specifically contemplated by the instant inventors. The resulting cathode surface should be dark in appearance (rather than having a shiny metallic surface) due to its coating by the reduced metal. As described by some chemists and as used herein and in the claims, this sort of dark surface is referred to as a "black". Although not essential to the invention, it is our belief that this black is a microcrystalline deposit of the metal in question. The "black" layer will preferably be essentially free of any semiconductor materials and most preferably will consist of conductive metal in elemental form. That being said, it should be noted that the instant invention will operate, albeit not as efficiently, if the "blackened" surface is shiny.

In addition to copper, examples of other materials suitable for forming the underlying base of cathode 2 include: nickel, lead, tin, chromium, graphite or graphitic carbon, gold, silver, chromium, platinum, palladium, and alloys thereof. The base could be even formed of a plastic or other non-conductive material onto which a conductive surface is applied, for example, by sputtering, painting, or other processes. The base will preferably be essentially free of any semiconductive materials and will most preferably consist essentially of conductive metal in elemental form, the most important property of the base being that it is conductive on the surface that is to form the cathode and sufficiently solid to support the coating(s). Further, it is possible in some cases for the base to also function as the blackening material, e.g., when the base is graphite or graphite carbon.

As will also be apparent to those skilled in the art, electroplating (blacking) metals other than nickel can alternatively be employed in the present invention. By using platinum salts and a platinum anode, for example, a thin surface layer of "platinum black" can be obtained. Examples of other suitable blacking materials include: palladium, copper, silver, gold, zinc, cadmium, thallium, indium, gallium, lead, tin, bismuth, antimony, arsenic, tellurium, selenium, iridium, rhodium, cobalt, iron, ruthenium, osmium, rhenium, manganese, tungsten, molybdenum, chromium, tantalum, niobium, vanadium, titanium, zirconium, lanthanum, ytterbium, scandium, strontium, praseodymium, neodymium, promethium, samarium, europium, gadolinium, terbium, dysprosium, holmium, erbium, thulium, and lutetium. Examples of additional suitable materials include mixtures, alloys, mercury amalgams, and combinations of the foregoing and similar metals, or combinations of these elements with other elements, where the above elements constitute the major (by weight) components.

The thickness of the "black" deposit is not critical so long as it is thick enough to coat the surface of the cathode and provide a high surface area for hydrogen generation and be dark enough to absorb light efficiently. Nickel, platinum, and palladium are good choices for electroplating as they are known to interact with hydrogen at an atomic level and are used for hydrogenerations in organic chemistry. Cobalt is also particularly well suited for use in the inventive apparatus as the cathode plating/blacking metal.

The instant inventors have determined that, if the coating is too thick, it may potentially interfere with the electrical conductivity of the cathode. Thus, for purposes of the overall efficiency of the instant invention, the preferred electrode deposit thickness will be under 1 mm thick, preferably less than 0.1 mm, and in some cases can be as little as only a few atoms thick. If the coating is too thick, the conductivity may suffer. If too thin, light absorption may suffer.

After a suitable amount of metal is deposited on the cathode 2, it is preferably removed from the plating bath, rinsed with water and is ready to be placed in the electrolysis cell.

Figure 5:
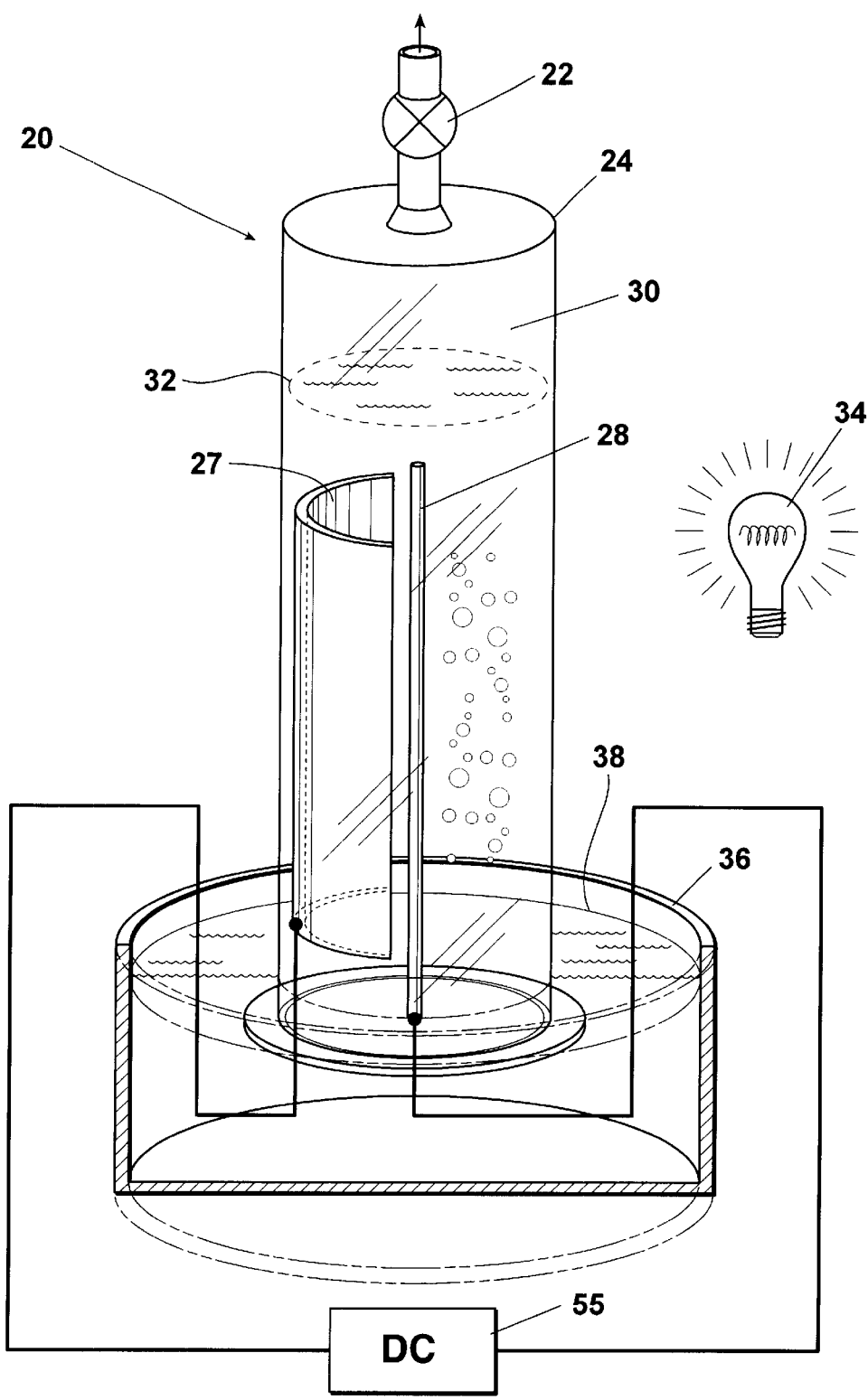
FIG. 5 provides a schematic diagram of an embodiment 20 of the inventive electrolysis apparatus.

An embodiment 20 of the inventive electrolysis apparatus is depicted in FIG. 5. Inventive apparatus 20 comprises: an upper valve 22; a barrel 24 (e.g., a barrel of a glass syringe); a cathode preferably prepared as discussed hereinabove and most preferably comprising copper foil with nickel metal electroplated on inside surface 27 thereof; an anode 28 (e.g., a nickel-chromium wire); an upper gas collection space 30 in barrel 24 (wherein both $H_2$ and $O_2$ accumulate); a level 32 of electrolyte solution in barrel 24; a light source 34; a base container 36 (e.g., a beaker); and a level 38 of electrolyte solution in base container 36. Inside surface 27 of cathode preferably faces anode 28 and light source 34.

In embodiment 20 of the inventive apparatus, the anode 28 is preferably a conductive wire composed of nickel-chromium alloy (e.g., nichrome). However, all that is necessary is that the anode be a good conductor of electricity and resistant to the corrosive conditions of the anode region of the cell. Examples of other suitable anode materials include: platinum, gold, titanium, nickel, graphite or graphite carbon, and alloys thereof. The anode will preferably be essentially free of any semiconductor materials.

Although many other arrangements are possible, the anode wire 28 is preferably placed adjacent the center of half cylinder cathode along the longitudinal axis thereof so that all points on the inside surface 27 of the cathode 2 are approximately equidistant from the anode 28. The half cylinder cathode 2 is preferably co-axial with the cylinder of barrel 24 and the anode 28 preferably extends along the center of the barrel at least as far as the cathode cylinder 2 extends. Cathode 2 and anode 28 can be kept in place and alignment, for example, by placing a cork or other inert structure in at the bottom of the barrel 24 which will hold the electrodes in place yet allow free movement of water/electrolyte into and out of the bottom of the syringe.

To prepare inventive electrolysis apparatus 20 for operation, valve 22 is opened and the barrel 24 is lowered into the electrolyte solution so that the solution 38 fills the bottom portion of the barrel up to the level in the surrounding container 36. Alternatively, and as further examples may be used to enable outside air to push the electrolyte liquid/solution up into the cell. Then, the valve 22 is closed and the barrel 24 is raised to a point where the bottom of the barrel 24 is just below the surface of the solution 38 in base container 36. This traps a column of the solution in barrel 24 up to level 32. This makes it possible to measure the amount of gas evolved by noting the change in level 32 in the barrel 24. Subsequently, barrel 24 can be re-lowered into the container 36 of solution and the valve 22 opened to release the gasses produced. Then, the valve 22 is closed, the cell 24 raised, and the system is ready for further operation.

Figure 3:
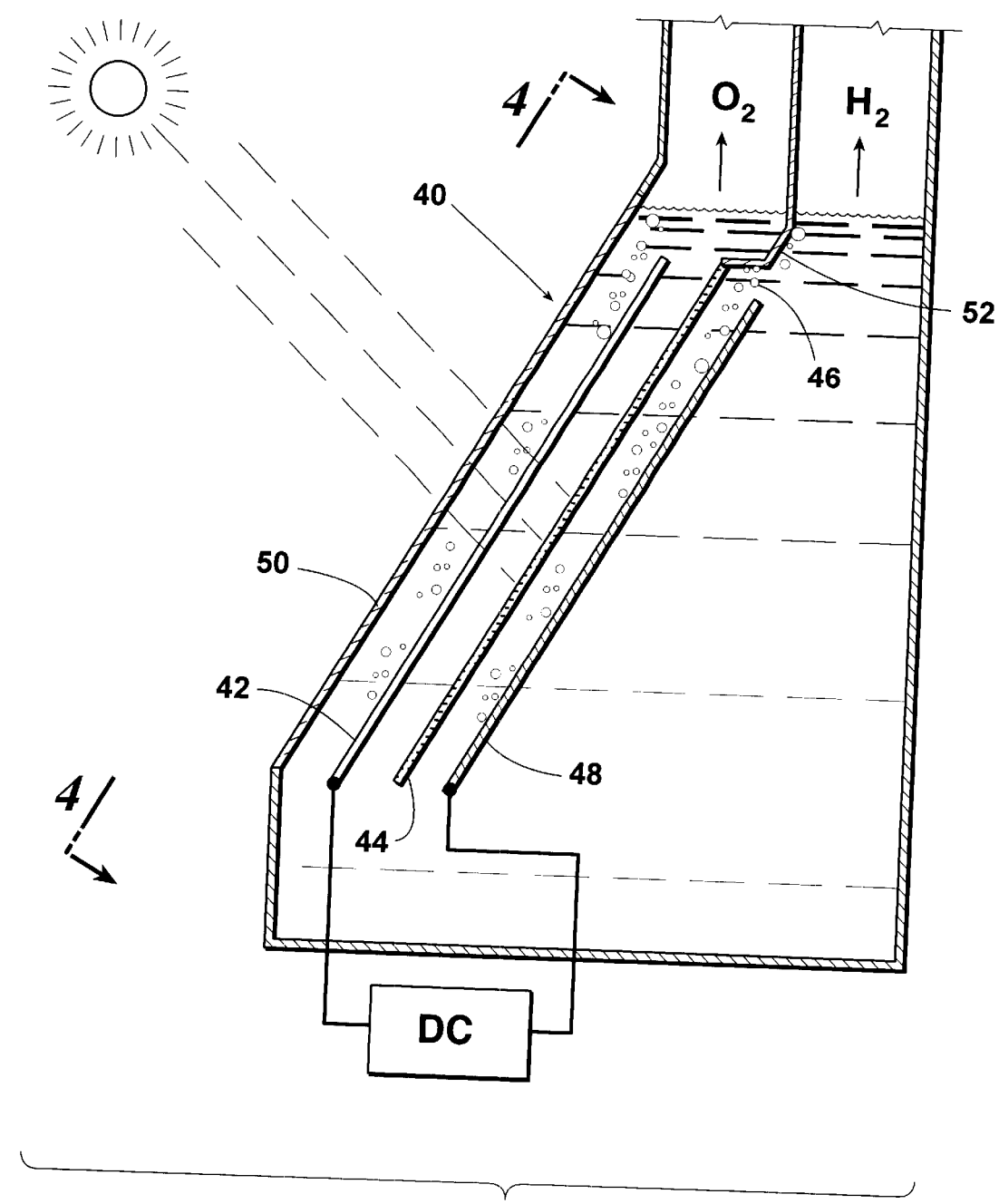
FIG. 3 provides a side-view of inventive apparatus 40.
Figure 4:
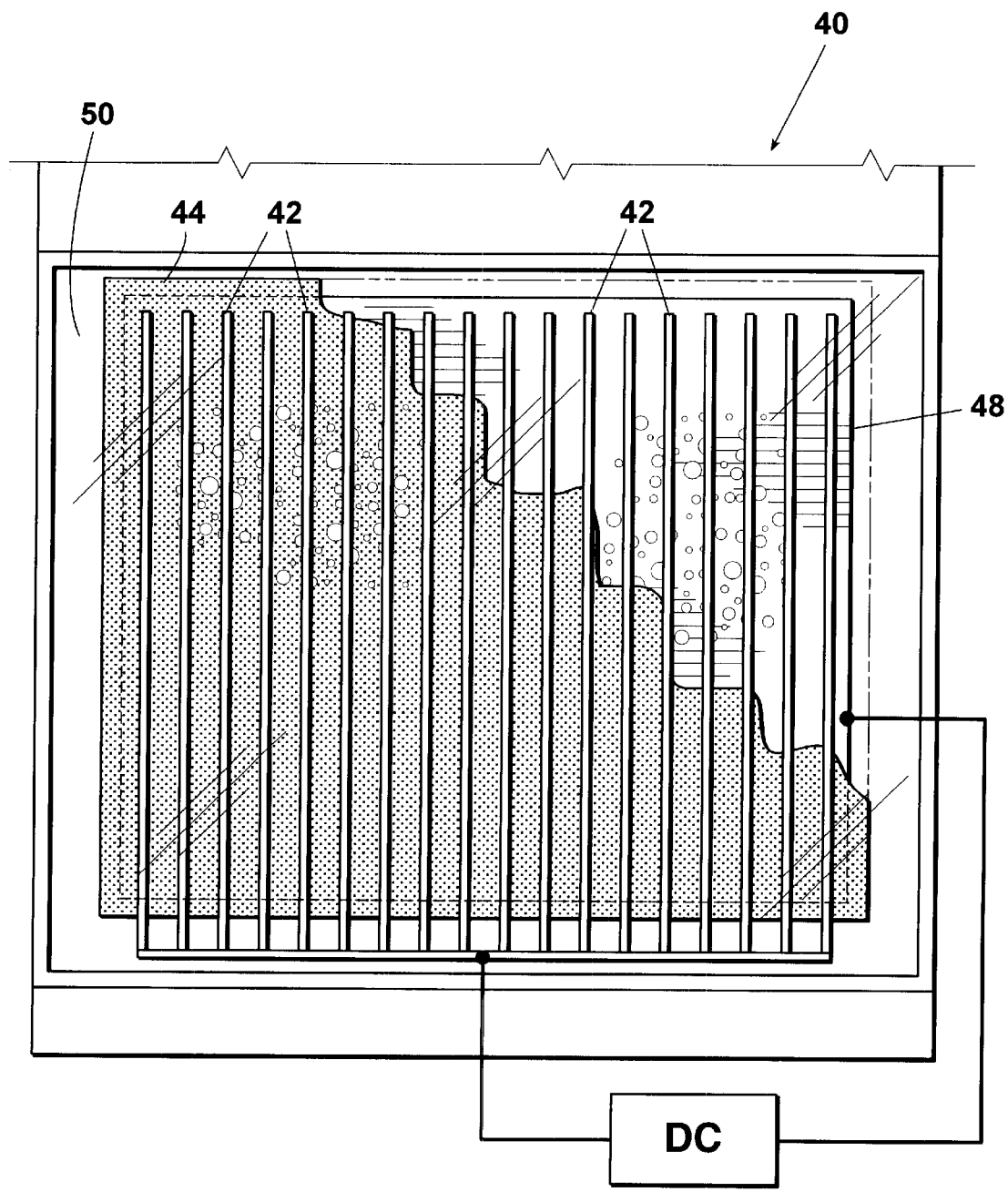
FIG. 4 provides a front view of inventive apparatus 40.

An alternative embodiment 40 of the inventive electrolysis apparatus is depicted in FIGS. 3 and 4. Inventive apparatus 40 comprises: an array of anode rods (e.g., wires) 42; a sheet of blacked cathodic material 48; a preferably transparent barrier membrane 44, positioned between anode array 42 and the blacked surface of cathode 48, which will allow free flow of ions, but not bubbles 46 of $H_2$ gas; and a transparent window 50 that allows light, preferably visible and ultraviolet, to pass therethrough to the blacked surface of cathode 48. The upper portion 52 of barrier 44 is preferably impermeable to gas to maintain separation between the hydrogen and oxygen produced.

For simplicity, the external electrical components of inventive apparatus 40 are not shown in FIGS. 4 and 5. Window 50 can be formed of glass. However, because much solar energy comes in the form of ultraviolet light which is largely absorbed by glass, it is preferred that the light admitting portions of the inventive cell be constructed of quartz, polymers, or other materials which will facilitate the transmission of UV light into the interior of the cell.

In the embodiment 20 of the inventive electrolysis apparatus depicted in FIG. 3, no effort is made to separate the hydrogen and oxygen gasses produced. However, it should be clear that cell 20 could be modified to allow for separation of the gasses produced. For example, a permeable or semi-permeable membrane, or even a thin, fine mesh sheet which could trap bubbles, but let light and the solution pass-through, could be used.

The electrolyte solution 38 employed in the inventive electrolysis system is most preferably a dilute solution of sulfuric acid ($H_2SO_4$) in water at a pH in the range of from about 0.5 to about 7. The solution 38 will most preferably have a pH of about 2. Of course, other inorganic and organic acids may be equally useful, as would many neutral salt solutions such as solutions of sodium sulfate ($Na_2SO_4$). Some salts such as sodium chloride may be less useful because of the generation of other gasses in the system that might be corrosive to the electrodes. Further, some magnesium or aluminum salts can form gels under certain conditions of pH, which would render the cell less conductive, less efficient, and perhaps even opaque (i.e., thereby blocking access of light to the cathode). Under some circumstances, alkaline electrolyte solutions (i.e. above pH 7) may be preferable. The main requirements are that the solutions be relatively conductive and not be overly corrosive to the electrodes under the electrolysis conditions, or opaque to light.

Examples of suitable electrolytes include: lithium, sodium, potassium, magnesium or beryllium, salts, specifically, sulfates, hydroxides, or fluorides, the main requirement being that the electrolyte solution be conductive, have only limited, and preferably no, absorbence of the incident light, and not interfere with the photo-assisted electrochemistry occurring at the electrodes.

Current for both the electroplating and the photo-assisted electrolysis is preferably provided by a standard commercial transformer 6, 55 of the type sold as a battery replacement. This could be replaced by batteries or almost any other source of DC current. For test and development purposes it is convenient to be able to vary the current and voltage. However, once an optimum is determined for a given cell, geometry and construction capability to vary the current should not be essential, but could be useful. For testing, it may also be desirable to use a standard meter to measure the voltages, current flow or amperage, and/or resistance of the cell or whole system, at various points before, during and after the experiment.

An overarching goal of this instant invention is to use solar energy—especially visible and ultraviolet light—to assist in the electrolysis of water. For testing purposes, the instant inventors have used a common "high intensity" table lamp generally available commercially, although many other light sources could have been selected in the alternative. It should be noted that this source is relatively poor in high energy UV light and rich in lower energy visible light photons.

One of the distinguishing characteristics of this invention is the ability to use visible light efficiently. If desired, filters could be used in to modify the light striking the cathode surface, or lenses or mirrors could be used to concentrate, reflect, or direct the light to optimum impact on the cathode. Further, where it would be advantageous to do so, narrow band or monochromatic light sources could be used.

EXAMPLE

Using an electroplating apparatus 1 as depicted in FIGS. 1 and 2, a cathode 2 was formed and electroplated with nickel. The DC power supply employed in the experimental system included a plug-in transformer and a variable resistor. A 5¢ nickel coin was used as the electroplating anode 8. The anode 8 and cathode 2 were connected to the power source using insulated copper wires 4 and 10 and alligator clips. Cathode 2 was formed from copper foil shaped as a half cylinder having a diameter substantially equal to that of a syringe barrel 24 to be used in the next stage of the test. The bath 5 employed in the electroplating process comprised one-half teaspoon $NiCl_2$ per 30 ml of water. The transformer was set at 4.5 V 300 mA and the nickel coin was moved back and forth over the inside surface of the copper cathode until the inside surface was fully and evenly electroplated with a micro-crystalline nickel layer. At the completion of the electroplating process, the cathode 2 was removed and rinsed with tap water.

Next, cathode 2 was employed in an electrolysis process using an electrolysis system as depicted in FIG. 5. The anode 28 used was a nichrome wire. The electrolyte 38 was an aqueous sulphuric acid solution having a pH of 2. Cathode 2 and anode 28 were held in place in syringe barrel 24 using a cork having holes formed therethrough to allow free movement of the electrolyte solution. The power source was linked to the cathode by means of an insulated copper wire soldered to the end of the cathode. The light source 34 employed in the test was an American Optical #655 lamp. The system 20 was tested with the light source 34 both on and off and using red, green, and blue dicroic additive filters. The system was also tested at various voltage differentials and with no input provided from the external power source. In each test, the syringe 34 was partially filled with electrolyte solution in the manner described above and the volume of solution in the syringe was recorded. The system was then operated for five minutes and the amount of hydrogen and oxygen gas generated in the test was determined by comparing the fluid volume in the syringe after the test to the fluid volume at the beginning of the test.

In these tests, no gas evolution was observed until the light source was turned on. The instant inventors also observed that lower voltages were required to produce electrolysis when the light was "ON" than under similar conditions when it was "OFF".

We believe that the observed increase in efficiency is related to the photoelectric effect as described by Albert Einstein where the energy of an electron emitted by a metal when struck by a photon of light is described by the equation:

$$E = h\upsilon - w$$

where E is the energy of the electron, h is Planck's constant, υ is the frequency of the incident light, and w is the work function of the metal. In general, the photoelectric effect is described using ultraviolet light which is of higher energy than visible light. Visible light generally does not have sufficient energy to give to an electron to enable it to reduce a hydrogen ion in solution to hydrogen gas. However, this limitation is overcome for purposes of the instant invention by creating an electrical potential between the anode and cathode.

The application of an electrical potential to the electrode modifies the previous equation to read as follows:

$$E = h\upsilon - w + P$$

where P is the energy associated with the externally imposed electric field.

Essentially, according to our theory of operation, photon energy is used to boost the energy of an electron from the cathode up to the energy level needed for electrolysis. From this it follows that the wavelength of light required to generate photolysis is related to the external electric field. As the field strength (voltage) increases, the minimum energy of photons needed to generate electrolysis drops into the visible range. With no external electrical field, only photons with high energy relative to visible light give the electrons enough energy to split water into its component hydrogen and oxygen. As the external electric potential increases, the minimum energy of a photon needed to split water drops into the visible spectrum, and potentially lower.

This is graphically depicted in Table 1. As illustrated in Table 1, the external potential on the electrodes provides the electron energy to go from A (energy level with no applied electric potential) to B (energy level with electric potential applied) but the electron does not have the energy to electrolyze water until that energy is provided by the photon of light. In other words, the energy A-C is the total needed for electrolysis, the energy A-B is provided by the externally imposed potential on the electrodes, and the energy B-C is provided by the light photons. The energy level B varies, increasing with increased imposed external potential. As the potential is raised, the additional photon energy required for electrolysis is reduced, enabling the capture and use of a larger portion of the incident light.

TABLE 1

| Increasing Energy Level | ——— C ———<br>(energy level needed to reduce water to hydrogen and oxygen)<br>——— B ———<br>(energy level of an electron in the metal with an external potential)<br>——— A ———<br>(energy level of an electron in the metal with no applied electric potential) |
|---|---|

Since, according to the photoelectric effect, a photon imparts energy to a single electron, the number of photons needed of above the minimum energy level is (within limits imposed by the cell design) directly proportional to the number of electrons produced and the amount of hydrogen and oxygen produced. In other words, the more intense the light, the more hydrogen will be produced, all other things being equal. However, the production of hydrogen can also be limited by the number of electrons available at the cathode, or the flow of electrons, or the electrical current.

In contrast to other systems heretofore contemplated, it is preferred that neither the cathode nor the anode employed in the inventive electrolysis apparatus include any semiconductor materials. The inventive apparatus will operate at voltages lower than 2.0, although such operation may be a less efficient use of the photoenergy. Additionally, in the instant invention, it is not necessary (but may be desirable) to add resistance to the circuit formed by the cathode and anode, other than the resistance that naturally occurs in the cell. Further, the instant invention uses light to energize the electrons in the cathode metal, rather than to ionize the electrolyte solution. The inventive system preferably uses the cathode to capture light and act as a surface for electrolysis.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. An apparatus for photoelectrolysis comprising:
   a container;
   a cathode positioned in said container; and
   an anode positioned in said container,
   said container being operable to allow transmission of light to said cathode from a light source external to said container,
   said cathode comprising a sheet of conductive metal blacked with a layer of conductive metal disposed on one side of said sheet of conductive metal in a manner such that said layer of conductive metal is operable for both absorbing said light and for acting as a cathodic surface for electrolysis, and
   said anode being an array of rods positioned adjacent said layer of conductive metal.

2. An apparatus for photoelectrolysis comprising:
   a container;
   a cathode positioned in said container; and
   an anode positioned in said container;
   said container being operable to allow transmission of light to said cathode from a light source external to said container,
   said cathode comprising a sheet of conductive metal blacked with a layer of conductive metal in a manner such that said layer of conductive metal is operable for both absorbing said light and for acting as a cathodic surface for electrolysis, and
   said sheet of conductive metal being formed in a shape of a partial cylinder having an inside surface and wherein said inside surface has been blacked with said layer of conductive metal.

3. The apparatus of claim 2 wherein said anode is an elongate member positioned adjacent said inside surface such that all points of said inside surface are substantially equidistant from said anode.

4. An apparatus for photo-assisted electrolysis comprising:
   a cathode effective both for collecting light energy to assist said electrolysis and for acting as an electrode for said electrolysis;
   an anode; and
   an external electrical power source electrically connected to said cathode and to said anode such that said external electrical power source is effective for establishing an electrical potential between said cathode and said anode.

5. The apparatus of claim 4 wherein said external electrical power source is effective for establishing a sufficient electrical potential between said cathode and said anode such that light energy in the visible spectrum collected by said cathode will assist said electrolysis.

6. The apparatus of claim 4 wherein said cathode includes no semiconductor materials.

7. The apparatus of claim 4 wherein said anode includes no semiconductor materials.

8. The apparatus of claim 4 wherein said cathode comprises a base of conductive metal blacked with a layer of conductive metal in manner such that said layer of conductive metal is effective for both absorbing light and acting as a cathode surface for said electrolysis.

9. The apparatus of claim 8 wherein said base has been blacked by electroplating a surface of said base to form said layer of conductive metal thereon.

10. The apparatus of claim 8 wherein said cathode consists essentially of only said base and said layer of conductive metal and wherein said base and said layer of conductive metal include no semiconductor materials.

11. The apparatus of claim 8 wherein said base consists essentially of a metal, in elemental form, selected from the group consisting of: copper, nickel, tin, silver, gold, platinum, palladium, graphite, graphite carbon, iron, chromium, manganese, titanium, and alloys thereof.

12. The apparatus of claim 11 wherein said base is formed of copper.

13. The apparatus of claim 8 wherein said layer of conductive metal consists essentially of a metal, in elemental form, selected from the group consisting of nickel, platinum, palladium, and cobalt.

14. The apparatus of claim 13 wherein said layer of conductive metal is formed of nickel.

15. The apparatus of claim 8 further comprising a container wherein said cathode and said anode are positioned, said container being effective for allowing transmission of light therethrough to said cathode from a light source external to said container.

16. The apparatus of claim 15 further comprising an acidic electrolyte in said container, said cathode and said anode being positioned in said acidic electrolyte.

* * * * *